United States Patent
Hattori

(10) Patent No.: US 11,022,196 B2
(45) Date of Patent: Jun. 1, 2021

(54) FLUID-FILLED TUBULAR VIBRATION-DAMPING DEVICE

(71) Applicant: SUMITOMO RIKO COMPANY LIMITED, Komaki (JP)

(72) Inventor: Masaya Hattori, Komaki (JP)

(73) Assignee: SUMITOMO RIKO COMPANY LIMITED, Komaki (JP)

(*) Notice: Subject to any disclaimer, the term of this patent is extended or adjusted under 35 U.S.C. 154(b) by 141 days.

(21) Appl. No.: 16/128,725

(22) Filed: Sep. 12, 2018

(65) Prior Publication Data

US 2019/0128365 A1    May 2, 2019

(30) Foreign Application Priority Data

Oct. 30, 2017   (JP) .............................. JP2017-209149

(51) Int. Cl.
| | |
|---|---|
| *F16F 13/16* | (2006.01) |
| *F16F 15/02* | (2006.01) |
| *F16F 15/027* | (2006.01) |
| *F16F 13/06* | (2006.01) |
| *B62D 33/06* | (2006.01) |

(52) U.S. Cl.
CPC ............ *F16F 15/022* (2013.01); *F16F 13/06* (2013.01); *F16F 15/027* (2013.01); *B62D 33/0604* (2013.01)

(58) Field of Classification Search
CPC .......... F16F 13/08; F16F 13/085; F16F 13/10; F16F 13/102; F16F 13/105; F16F 13/106; F16F 13/107; F16F 13/108; F16F 13/266; F16F 13/16

See application file for complete search history.

(56) References Cited

U.S. PATENT DOCUMENTS

| | | | | | |
|---|---|---|---|---|---|
| 2,432,050 | A | * | 12/1947 | Thiry ...................... | F16F 13/08 |
| | | | | | 267/140.11 |
| 5,195,728 | A | * | 3/1993 | Skipper .............. | B62D 33/0608 |
| | | | | | 267/140.12 |

(Continued)

FOREIGN PATENT DOCUMENTS

| | | | | | |
|---|---|---|---|---|---|
| EP | 0528253 | B1 | * | 7/1995 | .............. F16F 13/16 |
| EP | 0754877 | A1 | * | 1/1997 | .............. F16F 13/16 |

(Continued)

*Primary Examiner* — Bradley T King
*Assistant Examiner* — Stephen M Bowes
(74) *Attorney, Agent, or Firm* — Oliff PLC

(57) ABSTRACT

A fluid-filled tubular vibration-damping device including: an inner shaft member and an outer tube member connected elastically; a non-compressible fluid filling region formed between the members; and a partition wall rubber partitioning the filling region into fluid chambers at axially-opposite sides thereof connected by an orifice passage, wherein the partition wall rubber protrudes into the filling region on one of inner shaft member side and outer tube member side, while a concave groove opens to the filling region extending in a peripheral direction on an other of the sides, and a tip part of the partition wall rubber is inserted in the concave groove without being compressed in an axis-perpendicular direction and is configured to be axially pressed against an inner face of the concave groove to constitute a sealer fluid-tightly obstructing a space between the partition wall rubber and the inner face.

10 Claims, 8 Drawing Sheets

(56) References Cited

U.S. PATENT DOCUMENTS

| | | | | |
|---|---|---|---|---|
| 5,232,209 | A * | 8/1993 | de Fontenay | B60G 7/02 |
| | | | | 267/220 |
| 10,578,188 | B2 * | 3/2020 | Kojima | F16F 13/1418 |
| 2002/0079633 | A1 * | 6/2002 | Miyamoto | F16F 13/16 |
| | | | | 267/220 |
| 2017/0284502 | A1 | 10/2017 | Hattori | |

FOREIGN PATENT DOCUMENTS

| | | | | |
|---|---|---|---|---|
| EP | 1387111 A1 * | 2/2004 | | F16F 13/16 |
| JP | S64-35138 A | 2/1989 | | |
| JP | S64-35139 A | 2/1989 | | |
| JP | H01-135940 A | 5/1989 | | |
| JP | H02-29899 B2 | 7/1990 | | |
| JP | H02-29900 B2 | 7/1990 | | |
| JP | H06-24595 Y2 | 6/1994 | | |
| WO | WO-0142680 A1 * | 6/2001 | | F16F 13/16 |
| WO | 2017/038357 A1 | 3/2017 | | |

* cited by examiner

FLUID-FILLED TUBULAR VIBRATION-DAMPING DEVICE

INCORPORATED BY REFERENCE

The disclosure of Japanese Patent Application No. 2017-209149 filed on Oct. 30, 2017 including the specification, drawings and abstract is incorporated herein by reference in its entirety.

BACKGROUND OF THE INVENTION

1. Field of the Invention

The present invention relates to a fluid-filled tubular vibration-damping device capable of exhibiting vibration-damping effect based on flowing action of a fluid filled therein, and especially relates to a fluid-filled tubular vibration-damping device that is able to exhibit the vibration-damping effect in relation to an axial input vibration.

2. Description of the Related Art

Conventionally, a fluid-filled tubular vibration-damping device disclosed in Japanese Patent Republication No. JP-B-H2-029899 and the like, for example, has been used as a vibration-damping linkage device, a vibration-damping support device, or the like which is mounted between components of a vibration transmission system so as to reduce vibration. The fluid-filled tubular vibration-damping device generally includes an inner shaft member, an outer tube member, a main rubber elastic body connecting the inner shaft member and the outer tube member, two fluid chambers positioned between the inner shaft member and the outer tube member, and an orifice passage connecting the two fluid chambers. When a vibration is input, the fluid-filled tubular vibration-damping device exerts vibration-damping effect based on flowing action of the fluid flowing between the two fluid chambers via the orifice passage.

For the fluid-filled tubular vibration-damping device, a structure wherein a partition wall rubber that divides the two fluid chambers is movable in the axial direction relative to the inner shaft member as disclosed in JP-B-H2-029899 was proposed in order to obtain a forcible vibration-damping effect with respect to an axial input vibration.

In JP-B-H2-029899, there is disclosed a structure wherein a resin sleeve fixed to a radially inner face of the partition wall rubber is externally and slidably disposed on and about the inner shaft member. However, with this structure, it is necessary to prepare the resin sleeve and fix the resin sleeve on the radially inner face of the partition wall rubber, so that the structure is complex and it becomes difficult to manufacture. Additionally, leakage of fluid pressure and short-circuit of the fluid readily occurs between the both side fluid chambers through a gap between the resin sleeve and the inner shaft member, so that it is difficult to stably achieve the target vibration-damping performance.

International Publication No. WO 2017/038357 discloses a fluid-filled tubular vibration-damping device that includes a partition section of a structure wherein a radially outer face of an elastic section which protrudes radially outward from the side of an inner mounting member is pressed against a rigid body section provided on the side of an outer mounting member in a non-adhesive way in radial directions.

However, with the structure of WO 2017/038357, the elastic section is abutted against the rigid body section in the radial directions in a state of being deformed and compressed. Consequently, displacement of the elastic section relative to the rigid body section is less likely to occur, and if the elastic section is forced into relative displacement, there are problems such as noise by stick slip when the elastic section slides along the rigid body section, and the like.

Additionally, for the structure shown in FIG. 1 of WO 2017/038357, two liquid chambers divided by the elastic section and the rigid body section are easily short-circuited through a gap between the radially outer face of the elastic section and the radially inner face of the rigid body section. This might lead to reduction in the vibration-damping effect based on the fluid flowing action. Especially, the elastic section and the rigid body section are easily separated upon input of a load in the axis-perpendicular direction, so that the target vibration-damping effect sometimes fails to be exhibited due to short-circuit of the two liquid chambers via the space between the elastic section and the rigid body section.

SUMMARY OF THE INVENTION

The present invention has been developed in view of the above-described matters as the background, and it is an object of the present invention to provide a fluid-filled tubular vibration-damping device with a novel structure which is able to effectively exhibit the target vibration-damping performance by keeping fluid-tightness between fluid chambers when an axial vibration is input, while avoiding noise due to stick slip, and the like.

The above and/or optional objects of this invention may be attained according to at least one of the following modes of the invention. The following modes and/or elements employed in each mode of the invention may be adopted at any possible optional combinations.

Specifically, a first mode of the present invention provides a fluid-filled tubular vibration-damping device comprising: an inner shaft member; an outer tube member; a main rubber elastic body connecting the inner shaft member and the outer tube member; a filling region of a non-compressible fluid formed between the inner shaft member and the outer tube member; a partition wall rubber partitioning the filling region into two fluid chambers located at axially opposite sides of the partition wall rubber; and an orifice passage connecting the two fluid chambers, wherein the partition wall rubber protruding into the filling region is provided on one of a side of the inner shaft member and a side of the outer tube member, while a concave groove opening to the filling region and extending in a peripheral direction is provided on an other of the side of the inner shaft member and the side of the outer tube member, and a tip part of the partition wall rubber is inserted in the concave groove without being compressed in an axis-perpendicular direction, while the tip part of the partition wall rubber inserted in the concave groove is configured to be pressed against an inner face of the concave groove in an axial direction so as to constitute a sealer obstructing a space between the partition wall rubber and the inner face of the concave groove in a fluid-tight manner.

According to this fluid-filled tubular vibration-damping device structured following the first mode, when the inner shaft member and the outer tube member are displaced relative to each other in the axial direction, the tip part of the partition wall rubber inserted in the concave groove is abutted against the groove inner face of the concave groove in the axial direction. Consequently, the fluid chambers on both axial sides are separated by the partition wall rubber in a fluid-tight manner. This avoids short-circuit between the fluid chambers via the space between the partition wall rubber and the groove inner face of the concave groove when an axial vibration is input, so that it becomes possible to efficiently get vibration-damping effect owing to the orifice passage.

Additionally, the sealer is constituted by the structure wherein the tip part of the partition wall rubber is inserted in the concave groove. Owing to this, for example, also in a case where a vibration load is input not only in the axial direction but also in the axis-perpendicular direction, by keeping the state of the tip part of the partition wall rubber being inserted in the concave groove, short-circuit between the fluid chambers is prevented by the sealer, so that the target vibration-damping performance can be provided stably.

The tip part of the partition wall rubber inserted in the concave groove is not compressed in the axis-perpendicular direction. Therefore, when an axial vibration load is input, frictional resistance acting between the partition wall rubber and the inner face of the concave groove, or the like is reduced, and noise resulting from stick slip or the like is prevented.

A second mode of the present invention provides the fluid-filled tubular vibration-damping device according to the first mode, wherein the partition wall rubber protrudes radially outward from the side of the inner shaft member, while the concave groove is provided on the side of the outer tube member to open radially inward.

With the second mode, the partition wall rubber protruding to the outer periphery from the side of the inner shaft member is inserted in the concave groove provided on the side of the outer tube member, in an embodiment that the partition wall rubber is not compressed in the axis-perpendicular direction. Thus, upon input in the axial direction, short-circuit between the fluid chambers is avoided by contact between the partition wall rubber and the inner face of the concave groove, while noise due to friction between the partition wall rubber and the inner face of the concave groove or the like is also prevented. Besides, the partition wall rubber is provided on the side of the inner shaft member. Therefore, for example in a case that the partition wall rubber is formed integrally with the main rubber elastic body, it can be easier to manufacture the vibration-damping device by forming the main rubber elastic body and the partition wall rubber as an integrally vulcanization molded component incorporating the inner shaft member.

A third mode of the present invention provides the fluid-filled tubular vibration-damping device according to the second mode, wherein an orifice member forming the orifice passage is disposed in the outer tube member, while the concave groove is formed opening to a radially inner face of the orifice member.

According to the third mode, the orifice member is disposed in the outer tube member, so that it becomes easier to form the long orifice passage extending in the peripheral direction along the inner face of the outer tube member. Moreover, by forming the concave groove in the orifice member provided on the side of the outer tube member, it is possible to readily provide the concave groove on the side of the outer tube member.

A fourth mode of the present invention provides the fluid-filled tubular vibration-damping device according to any one of the first to third modes, wherein the main rubber elastic body has an outer wall rubber that constitutes a wall of the filling region on each axial side, and the partition wall rubber is molded integrally with the outer wall rubber on each axial side.

With the fourth mode, the partition wall rubber is provided at the main rubber elastic body, integrally with the outer wall rubber. This makes it possible to reduce the number of rubber vulcanization molded component, thereby simplifying the structure and decreasing the number of manufacturing steps, and the like.

A fifth mode of the present invention provides the fluid-filled tubular vibration-damping device according to any one of the first to fourth modes, wherein the tip part of the partition wall rubber inserted in the concave groove is separated in the axial direction from the inner face of the concave groove on each axial side so that the sealer is constituted by the tip part of the partition wall rubber being pressed against the inner face of the concave groove in the axial direction when the inner shaft member and the outer tube member are displaced relatively in the axial direction.

According to the fifth mode, the tip part of the partition wall rubber is separated from the inner face of the concave groove on the both axial sides, while the tip part of the partition wall rubber is not compressed in the axis-perpendicular direction. As a result, in the initial period of vibration input, the spring of the partition wall rubber is less likely to affect the spring characteristics of the fluid-filled tubular vibration-damping device. Thus, it is easier to realize comparatively soft spring characteristics in the fluid-filled tubular vibration-damping device.

A sixth mode of the present invention provides the fluid-filled tubular vibration-damping device according to any one of the first to fifth modes, wherein the tip part of the partition wall rubber inserted in the concave groove includes a pair of branch parts separated from each other in the axial direction, and the pair of branch parts are inserted into the concave groove so that the pair of branch parts are pressed against the inner face of the concave groove on corresponding axial sides so as to constitute the sealer.

With the sixth mode, the tip part of the partition wall rubber is pressed against the inner face of the concave groove in the axial direction in advance. Consequently, short-circuit between the fluid chambers via the space between the partition wall rubber and the concave groove is avoided from the initial period of vibration input, thus more favorably inducing relative pressure fluctuation for the fluid chambers. Moreover, the pair of branch parts, which are pressed against the groove inner face of the concave groove in the axial direction, are provided to be separate from one another in the axial direction. As a result, the pair of branch parts are less likely to be compressed by reaction force of pressing force in relation to the groove inner face of the concave groove, and higher dynamic spring by compression of the pair of branch parts is avoided. This effectively permits axial displacement of the partition wall rubber relative to the concave groove.

A seventh mode of the present invention provides the fluid-filled tubular vibration-damping device according to the sixth mode, wherein the pair of branch parts extend slanting outward in the axial direction as they go to a tip side thereof, while the inner face of the concave groove on each axial side expands slanting outward in the axial direction as it goes to an opening side of the concave groove, and outer peripheral ends of the pair of branch parts are pressed against the inner face of the concave groove on the corresponding axial sides so that the sealer is constituted.

According to the seventh mode, when an axial vibration is input, the partition wall rubber undergoes not only bending deformation but also compression deformation. Thus, the seal performance in the sealer can improve and the durability of the partition wall rubber can improve owing to reduction in tensile stress.

An eighth mode of the present invention provides the fluid-filled tubular vibration-damping device according to any one of the first to seventh modes, wherein a groove depth dimension of the concave groove is larger than a groove width dimension of the concave groove.

With the eighth mode, the groove depth dimension of the concave groove is larger than the groove width dimension thereof. Consequently, the partition wall rubber is inserted in the concave groove with a long range from the tip, so that, also in a case that a vibration in the axis-perpendicular direction is input for example, the partition wall rubber is less likely to be dislodged out of the concave groove. Therefore, short-circuit of the two fluid chambers is prevented with higher reliability, and the target vibration-damping performance can be stably obtained.

A ninth mode of the present invention provides the fluid-filled tubular vibration-damping device according to any one of the first to eighth modes, wherein a base part of the partition wall rubber is thicker in the axial direction than the tip part of the partition wall rubber inserted in the concave groove.

With the ninth mode, when the tip part of the partition wall rubber is abutted against the inner face of the concave groove in the axial direction, deformation amount of the partition wall rubber is limited on the basis of the deformation rigidity of the thick base part. This makes it possible to avoid dislodgement of the partition wall rubber from the concave groove. In addition, by thickening the base part of the partition wall rubber on which tensile stress easily acts by contact in relation to the inner face of the concave groove, the durability of the partition wall rubber is advantageously secured.

According to this invention, the partition wall rubber that partitions the filling region of the non-compressible fluid into the fluid chambers located at axially opposite sides thereof is inserted in the concave groove. Consequently, when the inner shaft member and the outer tube member are displaced relative to each other in the axial direction, the partition wall rubber inserted in the concave groove is abutted against the groove inner face of the concave groove in the axial direction. This avoids short-circuit between the fluid chambers, thus making it possible to efficiently provide vibration-damping effect owing to the orifice passage. Also, since the partition wall rubber inserted in the concave groove is not compressed in the axis-perpendicular direction, noise resulting from stick slip or the like is prevented when an axial vibration is input.

BRIEF DESCRIPTION OF THE DRAWINGS

The foregoing and/or other objects, features and advantages of the invention will become more apparent from the following description of embodiments with reference to the accompanying drawings in which like reference numerals designate like elements and wherein:

FIGS. 4A and 4B are cross sectional views showing a principal part of the cab mount shown in FIG. 1 as enlarged, wherein FIG. 4A shows a state in absence of input of an axial vibration load, while FIG. 4B shows a state in presence of input of an axial vibration load;

FIGS. 8A and 8B are cross sectional views showing a principal part of the cab mount shown in FIG. 5 as enlarged, wherein FIG. 8A shows a state in absence of input of an axial vibration load, while FIG. 8B shows a state in presence of input of an axial vibration load.

DETAILED DESCRIPTION OF EMBODIMENTS

Embodiments of the present invention will be described below in reference to the drawings.

Figure 1:
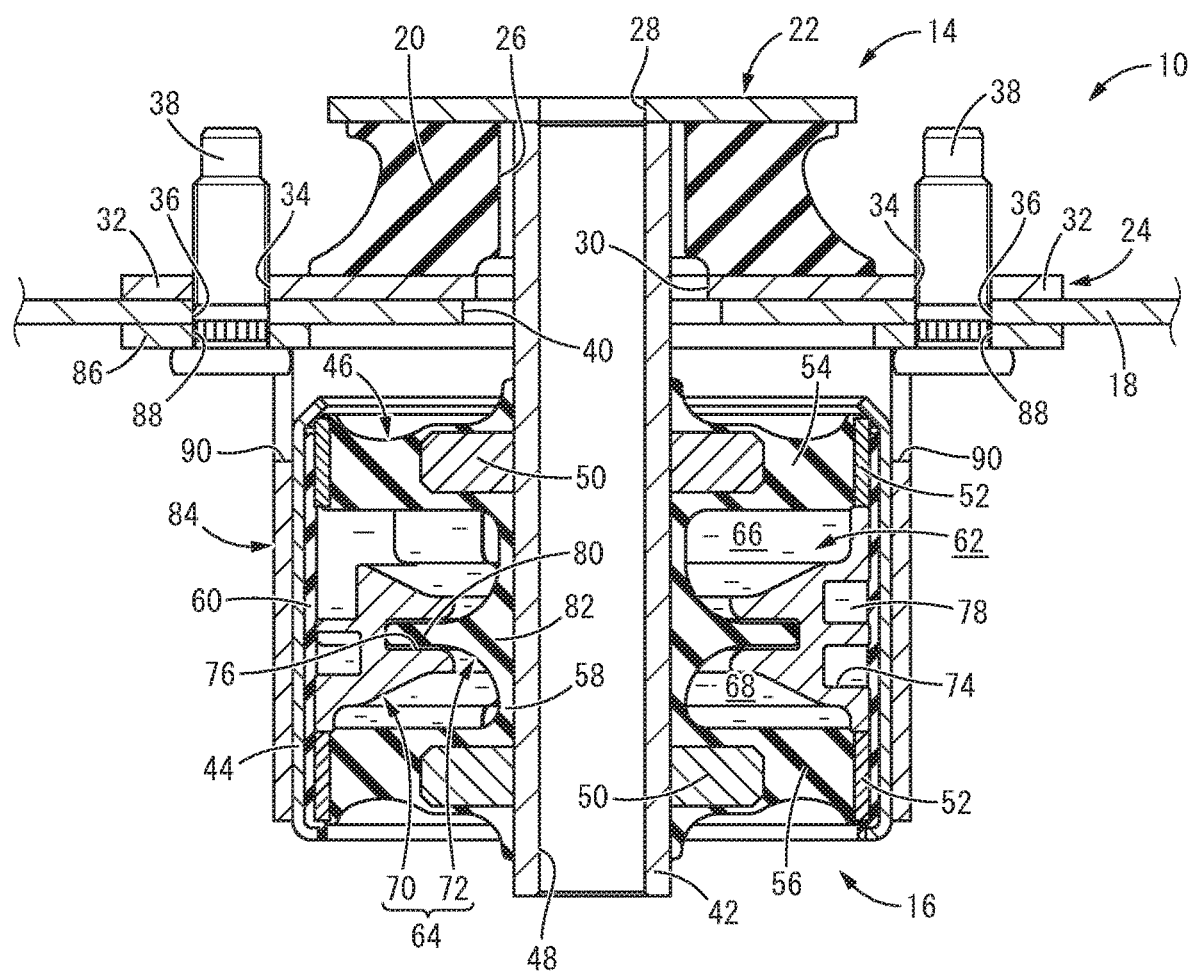
FIG. 1 is a cross sectional view showing a fluid-filled tubular vibration-damping device in the form of a cab mount as a first embodiment of the present invention.
Figure 2:
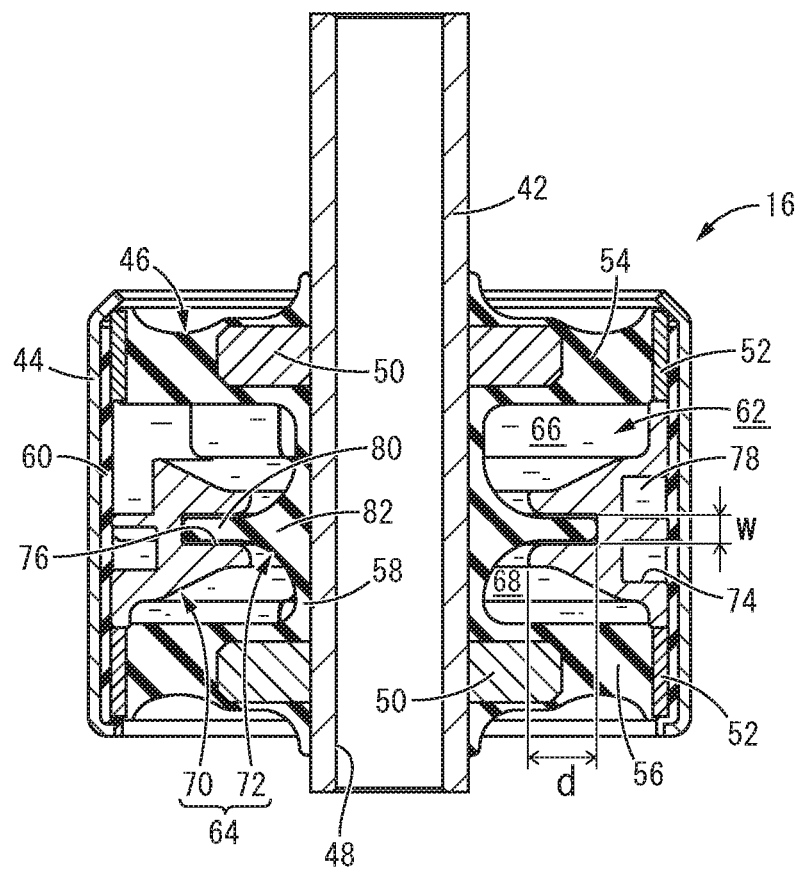
FIG. 2 is a cross sectional view of a lower mount constituting the cab mount shown in FIG. 1.
Figure 3:
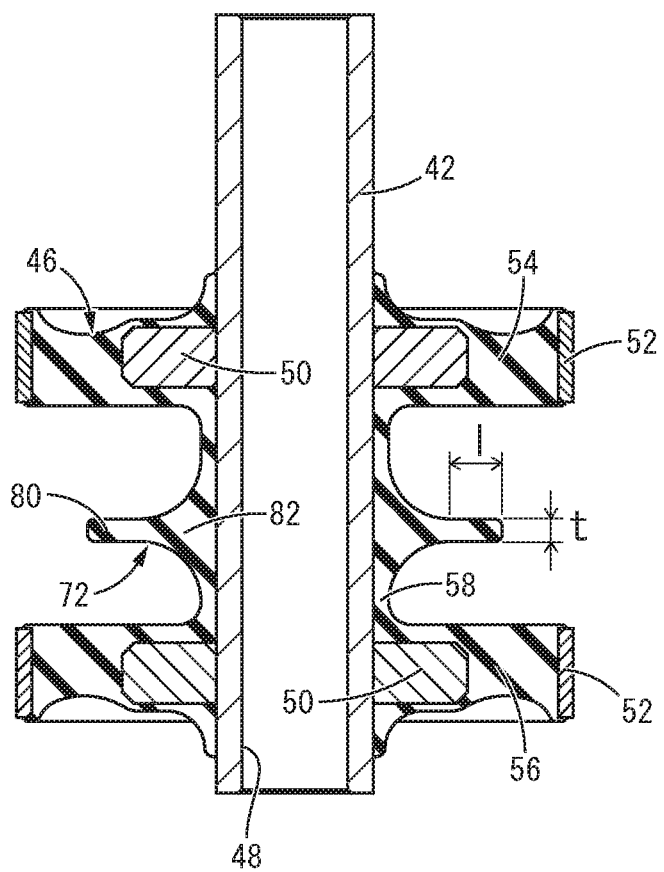
FIG. 3 is a cross sectional view of an integrally vulcanization molded component constituting the lower mount shown in FIG. 2.

FIG. 1 shows an automotive cab mount 10 having a fluid-filled tubular vibration-damping device of a structure according to this invention, as a first embodiment of this invention. The cab mount 10 of this embodiment has a structure wherein an upper mount 14 and a lower mount 16 are mounted as being combined in the up-down direction while clamping a vehicle body 18 between them. The fluid-filled tubular vibration-damping device according to the present invention is constituted including the lower mount 16. In the description hereafter, the up-down direction and the axial direction are the up-down direction in FIG. 1, which is roughly the up-down direction in a state of being mounted on the vehicle.

The upper mount 14 has a structure wherein a top plate metal fitting 22 and a bottom plate metal fitting 24 are superposed and fixed respectively to the upper and lower faces of a connection rubber elastic body 20.

The connection rubber elastic body 20 includes an inner hole 26 that passes through it on its central axis, and a tapered outer peripheral face whose diameter becomes gradually smaller as it goes upward. The top and bottom plate metal fittings 22, 24 have an annular plate shape respectively including central holes 28, 30. Each of the central holes 28, 30 is communicated with the inner hole 26 of the connection rubber elastic body 20.

The inner diameter of the central hole 28 of the top plate metal fitting 22 is smaller than any of the central hole 30 of the bottom plate metal fitting 24 and the inner hole 26 of the connection rubber elastic body 20. Additionally, at the bottom plate metal fitting 24, fixation parts 32 are provided at a plurality of locations in the circumferential direction while expanding to the outer periphery. In each fixation part 32, a bolt insertion hole 34 is formed.

The upper mount 14 is mounted in a state of being superposed on the upper face of the mount attachment section in the vehicle body 18. In the mount attachment section of the vehicle body 18, a plurality of bolt insertion holes 36 are formed, and a fixation bolt 38 is inserted through each bolt insertion hole 36 into the respective bolt insertion hole 34 of the bottom plate metal fitting 24, and a not-shown nut is threaded onto each fixation bolt 38. By so doing, the bottom plate metal fitting 24 is fixed to the vehicle body 18 with the plurality of fixation bolts 38, so that the upper mount 14 is attached to the vehicle body 18 in the bottom plate metal fitting 24.

In the mount attachment section of the vehicle body 18, a generally circular mounting hole 40 is formed through it in the up-down direction. The central holes 28, 30 of the top and bottom plate metal fittings 22, 24 and the inner hole 26 of the connection rubber elastic body 20 in the upper mount 14 open to the lower side of the vehicle body 18 via the mounting hole 40.

Meanwhile, the lower mount 16, which serves as a fluid-filled tubular vibration-damping device, has a structure wherein an inner shaft member 42 and an outer tube member 44 that are disposed nearly coaxially and separately by a prescribed distance in radial directions are elastically connected by a main rubber elastic body 46.

The inner shaft member 42 is in a cylindrical shape with a small diameter extending straightly in the up-down direction, and at its center, the inner shaft member 42 includes an inner hole 48 extending in the up-down direction. Especially in this embodiment, the inner shaft member 42 has substantially the same inner diameter dimension as the central hole 28 of the top plate metal fitting 22 of the upper mount 14, and a smaller outer diameter dimension than any inner diameters of the inner hole 26 of the connection rubber elastic body 20 and the central hole 30 of the bottom plate metal fitting 24 of the upper mount 14. Moreover, to the inner shaft member 42, upper and lower inside mating members 50, 50 are attached. These inside mating members 50 have a ring shape or an annular plate shape, and they are externally fixed to and about two locations mutually separated in the axial direction in the inner shaft member 42. Consequently, in the inner shaft member 42, outer projections projecting to the outer periphery at two locations separate in the up-down direction are provided by the inside mating members 50, 50.

In the outer periphery of the inner shaft member 42, upper and lower outside mating members 52, 52 are disposed coaxially and externally about the inner shaft member 42. The upper and lower outside mating members 52, 52 have a generally cylindrical shape with a thin wall, a large diameter, and a small axial dimension. The upper and lower outside mating members 52, 52 are disposed externally about the inner shaft member 42, at axial positions such that they face the upper and lower inside mating members 50, 50 in the radial directions.

Between the radially opposed faces of the inner shaft member 42 including the upper and lower inside mating members 50, 50 and the upper and lower outside mating members 52, 52, an upper rubber elastic body 54 and a lower rubber elastic body 56 are disposed to serve as outer wall rubbers constituting the main rubber elastic body 46. The upper and lower rubber elastic bodies 54, 56 each has a nearly annular plate shape, and, to the radially inner faces, the inner shaft member 42 and the upper and lower inside mating members 50, 50 are bonded by vulcanization, while to the outer peripheral faces, the upper and lower outside mating members 52, 52 are bonded by vulcanization. Besides, the radially inner ends of the upper and lower rubber elastic bodies 54, 56 are connected by a connection rubber 58 having a small-diameter tubular shape and the upper and lower rubber elastic bodies 54, 56 are formed integrally with each other. The connection rubber 58 is bonded by vulcanization to the outer peripheral face of the inner shaft member 42 between the inside mating members 50, 50 in the up-down direction.

Also, to the upper and lower outside mating members 52, 52, the outer tube member 44 is mounted such that the outer tube member 44 is externally fitted about them. The outer tube member 44 has a thin generally cylindrical shape with a large diameter, and to the radially inner face thereof, a seal rubber layer 60 is formed to cover it. The outer tube member 44 disposed externally about the upper and lower outside mating members 52, 52 is subjected to a diameter reduction process such as 360-degree radial compression, so that the outer tube member 44 is mounted externally to and about the upper and lower outside mating members 52, 52. The seal rubber layer 60 seals the gap between the fitting faces of the outer tube member 44 and the outside mating members 52, 52 fluid-tightly.

By mounting the outer tube member 44 in this way, a filling region 62 that is closed to the external space is defined between the radially opposed faces of the inner shaft member 42 and the outer tube member 44 and between the upper and lower rubber elastic bodies 54, 56 in the axial direction. For this filling region 62, a portion of the wall is constituted by the upper rubber elastic body 54, while another portion of the wall is constituted by the lower rubber elastic body 56, and the filling region 62 is filled with a non-compressible fluid. As the non-compressible fluid to be filled, a low-viscosity liquid such as water, ethylene glycol, alkylene glycol, polyalkylene glycol, silicone oil, and a mixture liquid of some of them is preferably adopted.

In the filling region 62, a partition wall 64 is disposed. The partition wall 64 has an annular plate shape as a whole, expanding in the axis-perpendicular direction in the space between the upper and lower rubber elastic bodies 54, 56 in the axial direction. The partition wall 64 is disposed across the radial space between the inner shaft member 42 and the outer tube member 44. This partition wall 64 partitions the filling region 62 at the substantial center in the up-down direction. On the upper side of the partition wall 64, there is formed an upper fluid chamber 66 whose wall is partially constituted by the upper rubber elastic body 54, while, on the lower side of the partition wall 64, there is formed a lower fluid chamber 68 whose wall is partially constituted by the lower rubber elastic body 56.

More specifically, the outer peripheral part of the partition wall 64 is constituted by an orifice member 70, while the radially inner part thereof is constituted by a partition wall rubber 72.

The orifice member 70 is a rigid member made of metal, synthetic resin, or the like. In this embodiment, the orifice member 70 is constituted by a pair of divided half bodies being combined in the diametrical direction, so that it takes a substantially annular shape as a whole. Additionally, each axial face of the orifice member 70 has a tapered shape that slants gradually inward in the axial direction as it goes to the radial inside, overall. Thus, the axial dimension of a radially inner part in the orifice member 70 is made small, while the outer peripheral end of the orifice member 70 protrudes to both axial sides and the axial dimension thereof is kept large.

Moreover, at the outer peripheral part of the orifice member 70, a peripheral groove 74 is provided extending in the circumferential direction while opening to the outer peripheral face. The peripheral groove 74 of this embodiment extends in a helical shape with a length of one circumference or longer in the circumferential direction.

Furthermore, a concave groove 76 is formed in the radially inner part of the orifice member 70. The concave groove 76 extends with a generally constant groove cross sectional shape across the entire periphery in the peripheral direction and opens onto the radially inner face of the orifice member 70. In this embodiment, the groove inner faces of the opening part of the concave groove 76 are curved faces, so that the opening part of the concave groove 76 gradually expands in the up-down direction as it goes to the radial inside. Note that the specific shape of the concave groove 76 is not especially limited. Preferably, the radial groove depth dimension d is larger than the axial groove width dimension w. More preferably, for the concave groove 76, the radial groove depth dimension d is twice as large as the axial groove width dimension w or larger than twice.

This orifice member 70 is inserted radially in the outer tube member 44, and the outer peripheral face of the orifice member 70 is fitted to the radially inner face of the outer tube member 44 covered with the seal rubber layer 60. Thus, the orifice member 70 is provided firmly on the side of the outer tube member 44 such that the concave groove 76 opens radially inward on the side of the outer tube member 44, whereby the concave groove 76 opens to the filling region 62. The outer peripheral part of the orifice member 70 protrudes to both axial sides, and the outer peripheral part is clamped and thus positioned in the axial direction between the upper and lower outside mating members 52, 52. In this embodiment, the radially inner end of the orifice member 70 is located on the radial inside of the outer peripheral ends of the upper and lower inside mating members 50, 50, and the radially inner end is disposed axially between the upper and lower inside mating members 50, 50.

The peripheral groove 74 of the orifice member 70 is covered by the outer tube member 44. This forms an orifice passage 78 extending in the circumferential direction along the radially inner face of the outer tube member 44. Both ends in the length direction of this orifice passage 78 open respectively to the upper fluid chamber 66 and the lower fluid chamber 68, whereby the upper and lower fluid chambers 66, 68 are connected to each other by the orifice passage 78.

In this embodiment, the orifice member 70 is attached to the radially inner face of the outer tube member 44 and the orifice passage 78 is provided to extend in the circumferential direction along the outer tube member 44, so that it is easy to provide a long passage length for the orifice passage 78. As a result, it is possible to set the tuning frequency of the orifice passage 78 that is set based on the ratio between the passage length and the passage cross sectional area, with a greater degree of freedom. In the present embodiment, the seal rubber layer 60 is disposed between the radially inner face of the outer tube member 44 and the outer peripheral face of the orifice member 70, whereby the opening of the peripheral groove 74 is covered fluid-tightly, thus avoiding leakage of the fluid flowing in the orifice passage 78.

Meanwhile, the partition wall rubber 72 is a rubber elastic body having a nearly annular plate shape as a whole, and it is formed integrally with the connection rubber 58 constituting the main rubber elastic body 46. The partition wall rubber 72 protrudes into the filling region 62 in the outer periphery from the side of the inner shaft member 42. The partition wall rubber 72 of the present embodiment is formed integrally with the upper and lower rubber elastic bodies 54, 56, as is clear from the fact that it is formed integrally with the connection rubber 58, and it constitutes a portion of the main rubber elastic body 46.

With the partition wall rubber 72, an outer peripheral part 80, which is the tip part, expands with a nearly constant axial thickness dimension, while a radially inner part 82, which is the base part, has a tapered shape such that the axial thickness dimension of the base part gradually grows larger as it goes to the radial inside. As a result, the radially inner part 82 is thicker than the outer peripheral part 80. In relation to the outer peripheral part 80 of the partition wall rubber 72 whose axial thickness dimension is approximately constant, the radial length dimension l is larger than the axial thickness dimension t, and the radial length dimension l is preferably twice as large as the axial thickness dimension t or larger than twice. Moreover, for the partition wall rubber 72, the radial length dimension of the outer peripheral part 80 is larger than the radial length dimension of the radially inner part 82. The outer diameter dimension of the partition wall rubber 72 is as small as or smaller than the inner diameter dimension of a portion in the orifice member 70 where the concave groove 76 is formed.

The outer peripheral part 80 of the partition wall rubber 72 is inserted in the concave groove 76 of the orifice member 70, and the orifice member 70 and the partition wall rubber 72 constitute the partition wall 64 that separates the upper and lower fluid chambers 66, 68.

Figure 4A:
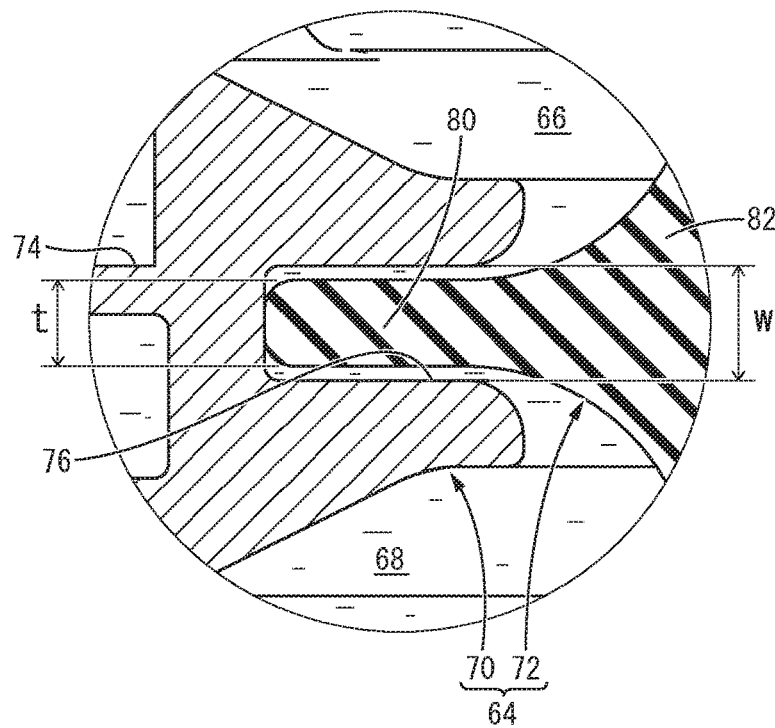

The outer peripheral part 80 of the partition wall rubber 72 is inserted with a gap relative to the inner face of the concave groove 76 of the orifice member 70 on each axial side. Specifically, as FIG. 4A shows, the axial groove width dimension w of the concave groove 76 is larger than the axial thickness dimension t of the outer peripheral part 80 of the partition wall rubber 72, and a gap is provided axially between the outer peripheral part 80 of the partition wall rubber 72 and the groove inner face of the concave groove 76.

Besides, the outer diameter dimension of the partition wall rubber 72 is as small as or smaller than the inner dimension in the radial directions of the concave groove 76. Consequently, the partition wall rubber 72 is inserted in the concave groove 76 of the orifice member 70 without being compressed in the radial directions. In short, the outer peripheral face of the partition wall rubber 72 is separated to the radial inside from the groove bottom inner face of the concave groove 76, or it is abutted on the groove bottom inner face of the concave groove 76, with no allowance. By so doing, frictional resistance between the outer peripheral face of the partition wall rubber 72 and the groove bottom inner face of the concave groove 76 is about zero, when the partition wall rubber 72 and the orifice member 70 are displaced relative to one another in the axial direction. In the case where the outer peripheral face of the partition wall rubber 72 and the groove bottom inner face of the concave groove 76 are spaced apart, a gap between the partition wall rubber 72 and the groove inner face of the concave groove 76 is connected to the upper and lower fluid chambers 66, 68.

The lower mount 16 wherein the upper and lower fluid chambers 66, 68 are formed by being partitioned by the partition wall 64 of this structure is mounted and superposed to the lower face of the mount attachment section in the vehicle body 18.

The inner shaft member 42 of the lower mount 16 extends out axially upward from the outer tube member 44, and protrudes upward via the mounting hole 40 formed in the mount attachment section of the vehicle body 18. Into the upper mount 14, which is mounted from above to the mount attachment section of the vehicle body 18, the inner shaft member 42 is inserted from below, while superposing the upper end of the inner shaft member 42 to the radially inner end of the top plate metal fitting 22 of the upper mount 14.

The top plate metal fitting 22 of the upper mount 14 and the inner shaft member 42 of the lower mount 16 are mounted to a cab housing of the vehicle, by a not-shown fixation bolt inserted through the central hole 28 of the top plate metal fitting 22 and the inner hole 48 of the inner shaft member 42. In this mounted state, the top plate metal fitting 22 of the upper mount 14 and the inner shaft member 42 of the lower mount 16 are made integral by fastening fixation owing to fastening force of the fixation bolt.

In the outer periphery of the inner shaft member 42, a prescribed space is set between the inner shaft member 42 and any of the radially inner face of the inner hole 26 of the connection rubber elastic body 20 and the radially inner face of the central hole 30 of the bottom plate metal fitting 24 in the upper mount 14, and the radially inner face of the mounting hole 40 of the vehicle body 18. By this space, upon input of a vibration load, interference and contact of the inner shaft member 42 with respect to the connection rubber elastic body 20, the bottom plate metal fitting 24, and the vehicle body 18 are reduced or eliminated.

On the other hand, the outer tube member 44 of the lower mount 16 is fixed and mounted to the vehicle body 18 via an outer bracket 84.

The outer bracket 84 has a large-diameter cylindrical shape, and the outer tube member 44 of the lower mount 16 is secured press-fit into the outer bracket 84. Also, at the opening peripheral end on the side of the axially upper end of the outer bracket 84, a flange part 86 expanding to the outer periphery is integrally formed, and a plurality of bolt insertion holes 88 are provided in the flange part 86.

All the bolt insertion holes 88 are positioned relative to the bolt insertion holes 36 of the vehicle body 18 and the bolt insertion holes 34 of the bottom plate metal fitting 24 in the upper mount 14. Consequently, by the fixation bolts 38 inserted in the bolt insertion holes 88 and the bolt insertion holes 36, 34, the vehicle body 18, the upper mount 14, and the outer bracket 84 are fastened and secured to one another. In the peripheral wall of the outer bracket 84, a window 90 is formed at a circumferential position corresponding to each bolt insertion hole 88, thus preventing interfere of the head part of the fixation bolt 38.

However, in the cab mount 10 of this embodiment having the above-referenced structure, in relation to an axial static support load, a prescribed support spring characteristics is exerted mainly by compression deformation in the connection rubber elastic body 20 of the upper mount 14. When a support load in the axis-perpendicular direction is input, a prescribed support spring characteristics is exerted by the connection rubber elastic body 20 of the upper mount 14 that undergoes shear deformation, and the upper and lower rubber elastic bodies 54, 56 of the lower mount 16 that undergo compression deformation.

Additionally, upon input of an axial vibration load between the inner shaft member 42 and the outer tube member 44, the fluid flows through the orifice passage 78 between the upper and lower fluid chambers 66, 68 in the lower mount 16, so that a prescribed vibration-damping effect is exhibited on the basis of the flowing action of the fluid.

Then, with both of the upper and lower rubber elastic bodies 54, 56 that constitute the outside wall parts of the upper and lower fluid chambers 66, 68, the radial inside and outside are fixed respectively to the inner shaft member 42 and the outer tube member 44, and the rubber elastic bodies 54, 56 undergo shear deformation in roughly the same direction. On the other hand, for the partition wall 64, the outer peripheral part is constituted by the rigid orifice member 70, while the partition wall rubber 72 constituting the radially inner part is inserted in the concave groove 76 of the orifice member 70. The radial free length of the partition wall rubber 72 is shorter than those of the upper and lower rubber elastic bodies 54, 56.

As a result, the amount of change in volume of the upper and lower fluid chambers 66, 68 by elastic deformation of the upper and lower rubber elastic bodies 54, 56 is larger than the amount of change in volume of the upper and lower fluid chambers 66, 68 by elastic deformation of the partition wall rubber 72. This induces pressure fluctuation in the upper and lower fluid chambers 66, 68. Based on this pressure fluctuation, the fluid flows between the upper and lower fluid chambers 66, 68 via the orifice passage 78, thus exhibiting the vibration-damping effect owing to the flowing action such as the resonance action of the fluid.

Particularly, neither of the upper and lower fluid chambers 66, 68 in this embodiment has a flexible wall part that is easily deformable. The upper and lower fluid chambers 66, 68 are pressure-receiving chambers wherein reverse pressure fluctuations occur depending on positive/negative relation, when an axial vibration load is input. This makes it possible to assertively and largely keep the water head pressure and the flow amount of the fluid that flows through the orifice passage 78 when the vibration is input.

In addition, in this embodiment, each axial face of the orifice member 70 has a tapered shape that slants axially inward as it goes to the radial inside, i.e., the axial dimension of the orifice member 70 is small in the radial inside. Therefore, volume of the upper and lower fluid chambers 66, 68 is kept largely, while the elastic deformation amount of the upper and lower rubber elastic bodies 54, 56 is less likely to be limited by interfere of the orifice member 70. Consequently, the amount of the fluid flowing via the orifice passage 78 is ensured more efficiently.

Figure 4B:
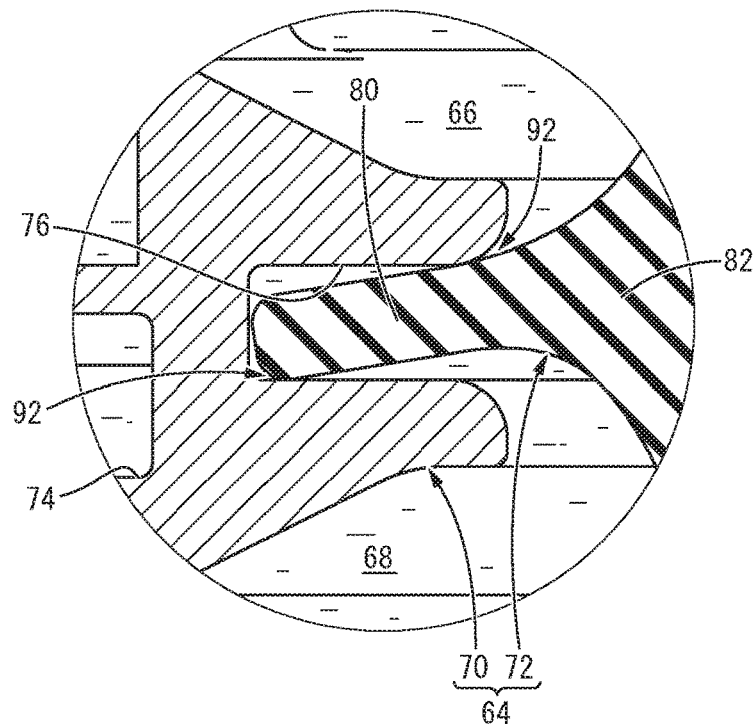

When input of an axial vibration load displaces the inner shaft member 42 and the outer tube member 44 relative to each other in the axial direction, as FIG. 4B shows, the partition wall rubber 72 provided on the side of the inner shaft member 42 and the orifice member 70 provided on the side of the outer tube member 44 are displaced relative to one another in the axial direction. As a result, the outer peripheral part 80 of the partition wall rubber 72 is pressed against the groove inner face of the concave groove 76 of the orifice member 70 in the axial direction. By so doing, the space between the partition wall rubber 72 and the groove inner face of the concave groove 76 in the axial direction is partially obstructed in a fluid-tight manner, whereby sealers 92 are constituted to prevent short-circuit between the upper and lower fluid chambers 66, 68 via the space. This efficiently induces relative internal pressure fluctuation between the upper and lower fluid chambers 66, 68, and the amount of the fluid flowing through the orifice passage 78 is kept, thereby effectively exerting vibration-damping effect owing to the orifice passage 78.

Particularly in the present embodiment, in the relative axial displacement of the inner shaft member 42 and the outer tube member 44, the outer peripheral part 80 of the partition wall rubber 72 that is inserted in the concave groove 76 is abutted against the groove inner faces of the concave groove 76 at the both axial faces thereof. Therefore, short-circuit of the upper and lower fluid chambers 66, 68 via the gap between the partition wall rubber 72 and the groove inner faces of the concave groove 76 is more effectively avoided, so that the vibration-damping performance improves. However, it is not necessary that the partition wall rubber 72 be deformed elastically as FIG. 4B shows and tilted to be abutted against the groove inner faces of the concave groove 76 on both axial sides. For example, it is also possible that the partition wall rubber 72 is moved in the axial direction inside the concave groove 76 corresponding to the phase of the input vibration, whereby either of the upper and lower faces of the partition wall rubber 72 is abutted against the groove inner faces of the concave groove 76.

In the present embodiment, the partition wall rubber 72 is spaced away from the inner faces on the both axial sides of the concave groove 76 to form the space. Meanwhile, the partition wall rubber 72 is not pressed against the orifice member 70 in the radial directions. Consequently, the spring of the partition wall rubber 72 is less likely to affect the spring characteristics of the lower mount 16 in the initial period of the vibration input, so that soft spring characteristics can be realized in the lower mount 16.

Also, the partition wall rubber 72 is not fixed to the orifice member 70 and it is displaceable relative to the orifice member 70 in the partition wall 64. By so doing, upon input of an axial vibration load, even if the partition wall rubber 72 with a small free length undergoes shear or bending deformation, the partition wall rubber 72 is resistant to damage, i.e., excellent durability is realized. It is because the outer peripheral part 80 of the partition wall rubber 72 is allowed to be displaced radially inward relative to the orifice member 70 when the radially inner part 82 of the partition wall rubber 72 undergoes shear or bending deformation, thus reducing the tensile stress acting on the surface of the partition wall rubber 72.

Moreover, with respect to the partition wall rubber 72, the radially inner part 82 disposed on the radial inside of the orifice member 70 is thicker in the axial direction than the outer peripheral part 80 inserted in the concave groove 76. This advantageously keeps the durability for the radially inner part 82 that undergoes elastic deformation when an axial vibration load is input. Especially in this embodiment, the axial thickness dimension of the radially inner part 82 gets gradually larger as it goes to the radial inside, which is the base end side, while the both axial faces of the radially inner part 82 are curved faces and the free surface thereof is set largely, thereby further improving the durability of the radially inner part 82. Additionally, since the radially inner part 82 of the partition wall rubber 72 is made thick, and the deformation rigidity of the radially inner part 82 is thus set comparatively large. Accordingly, when the outer peripheral part 80 of the partition wall rubber 72 is pressed against the groove inner faces of the concave groove 76, the contact state between the outer peripheral part 80 and the groove inner faces of the concave groove 76 is easily maintained in a stable manner, so that prevention of short-circuit improves the vibration-damping performance.

In the present embodiment, the radial groove depth dimension d of the concave groove 76 is made larger than the axial groove width dimension w of the concave groove 76. Thus, also upon input of a vibration, the outer peripheral part 80 of the partition wall rubber 72 is rarely dislodged out of the concave groove 76, thereby stably exerting the target performance. Besides, in this embodiment, the outer peripheral face of the partition wall rubber 72 is disposed to be abutted against or be close to the groove bottom inner face of the concave groove 76, and the outer peripheral part 80 of the partition wall rubber 72 is inserted with sufficient length in the radial directions in the concave groove 76. This avoids dislodgement of the partition wall rubber 72 from the concave groove 76.

Figure 5:
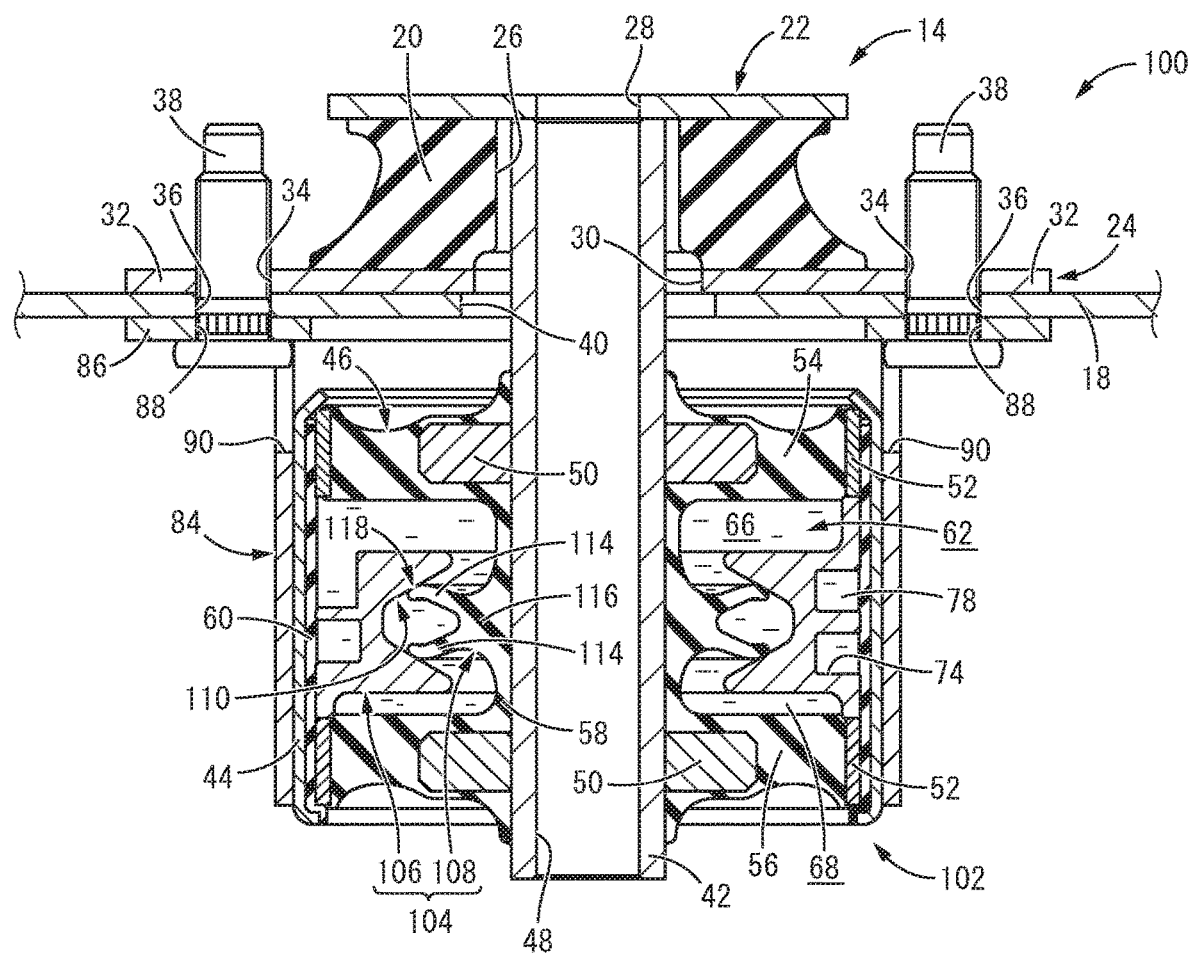
FIG. 5 is a cross sectional view showing a cab mount as a second embodiment of the present invention.

Next, FIG. 5 shows a cab mount 100 serving as a second embodiment of the present invention. The cab mount 100 includes the upper mount 14 and a lower mount 102 serving as a fluid-filled tubular vibration-damping device. In the description hereinafter, members and parts nearly equal to those of the first embodiment will be given the same code number as those of the first embodiment in the drawings, and a detailed description of those will be omitted.

Figure 6:
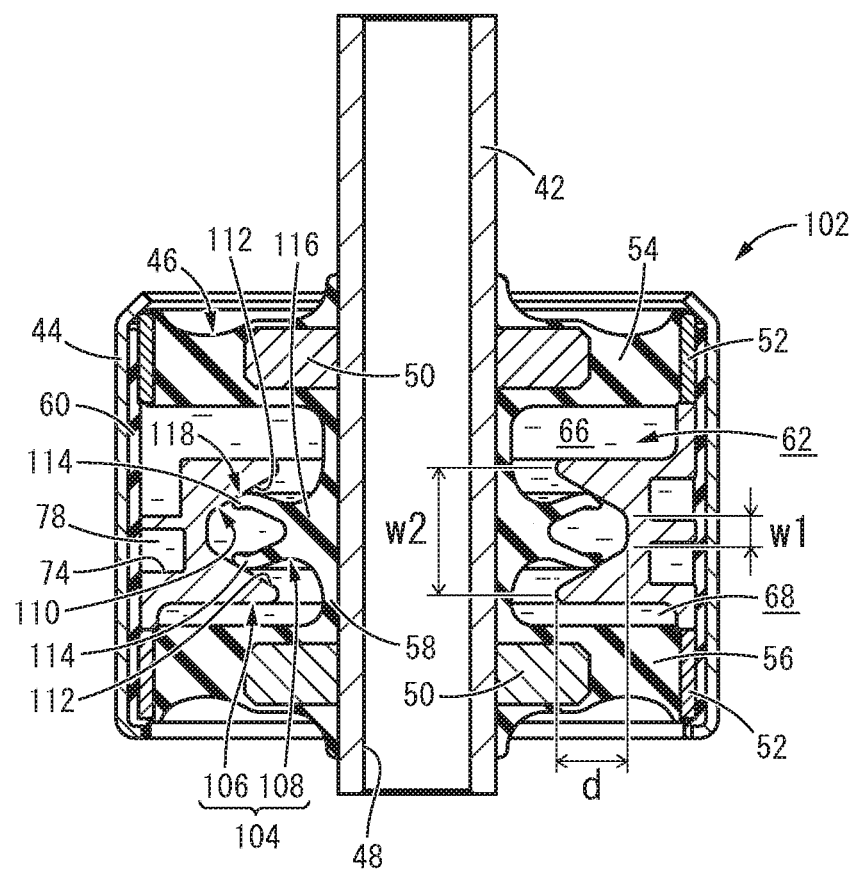
FIG. 6 is a cross sectional view of a lower mount constituting the cab mount shown in FIG. 5.

More specifically, as FIG. 6 shows, the lower mount 102 includes a partition wall 104 that divides the upper fluid chamber 66 and the lower fluid chamber 68. Moreover, the outer peripheral part of the partition wall 104 is constituted by a orifice member 106, while the radially inner part of the partition wall 104 is constituted by a partition wall rubber 108.

In the same way as the first embodiment, the orifice member 106 is constituted by a pair of divided half bodies combined in the diametrical direction, and takes a substantially annular shape as a whole. In this embodiment, both axial faces of the orifice member 106 expand roughly in the axis-perpendicular direction. The radially inner part of the orifice member 106 has a nearly constant thickness dimension, while the outer peripheral end part of the orifice member 106 protrudes to both axial sides so that the part has a larger axial dimension.

Furthermore, a concave groove 110 is formed in the radially inner part of the orifice member 106. The concave groove 110 extends with a generally constant groove cross sectional shape across the entire periphery and opens in the radially inner face of the orifice member 106 to the filling region 62. In relation to the concave groove 110 of this embodiment, the axial groove width dimension grows gradually larger as it goes to the side of opening (the radially inner opening in this embodiment), and the groove inner faces on the both axial sides are tapered faces 112, 112 that are inclined outward in the axial direction as they go to the side of the groove opening (the radial inside in this embodiment).

The radial depth dimension d of the concave groove 110 is larger than the axial width dimension w1 of the outer peripheral end thereof and smaller than the axial width dimension w2 of the radially inner end thereof.

Meanwhile, the partition wall rubber 108 is a rubber elastic body having a substantially annular plate shape as a whole that protrudes radially outward from the side of the inner shaft member 42 toward the filling region 62. The partition wall rubber 108 is formed integrally with the upper and lower rubber elastic bodies 54, 56 via the connection rubber 58, and it constitutes a portion of the main rubber elastic body 46.

Figure 7:
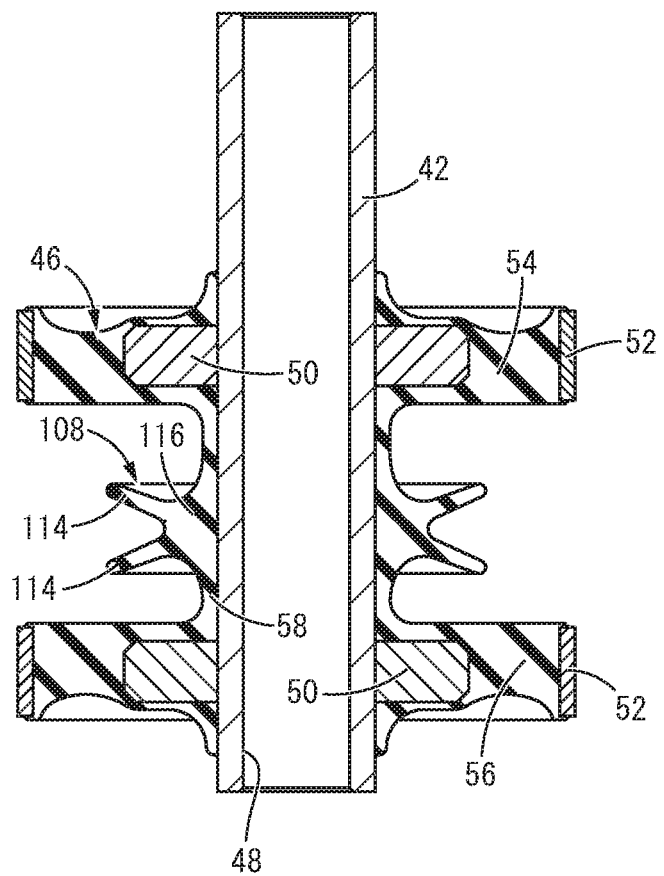
FIG. 7 is a cross sectional view of an integrally vulcanization molded component constituting the lower mount shown in FIG. 6.

The partition wall rubber 108 has a shape wherein the outer peripheral part that is the tip part branches away in the up-down direction. Specifically, a pair of branch parts 114, 114 are separated from each other in the axial direction and provided at the outer peripheral part of the partition wall rubber 108. As FIG. 7 shows, the branch part 114 has a tapered plate shape that extends gradually slanting outward in the axial direction as it goes to the tip side (the outer periphery in this embodiment), and it extends with an approximately constant thickness in this embodiment. Besides, the protruding tip face of the branch part 114 is a curved face that is curved generally in an arcuate shape in the longitudinal cross section shown in FIG. 7, and the protruding tip part of the branch part 114 becomes thinner as it goes to the tip side. In the present embodiment, the upper and lower branch parts 114, 114 have a substantially symmetrical shape in relation to a plane expanding in the axis-perpendicular direction. However, the upper and lower branch parts 114, 114 may have an asymmetrical shape relative to each other, and for example, they may be inclined at inclination angles different from one another.

A radially inner part 116 located on the base end side of the branch part 114 in the partition wall rubber 108 is thicker in the axial direction than the branch part 114, while the both axial faces of the radially inner part 116 are curved faces that are concave opening to the axial outside, which are continuous smoothly to the axially outer faces of the branch part 114.

The pair of branch parts 114, 114 which are the outer peripheral part of the partition wall rubber 108 are inserted in the concave groove 110 of the orifice member 106. These orifice member 106 and partition wall rubber 108 constitute the partition wall 104 that divides the upper and lower fluid chambers 66, 68.

Figure 8A:
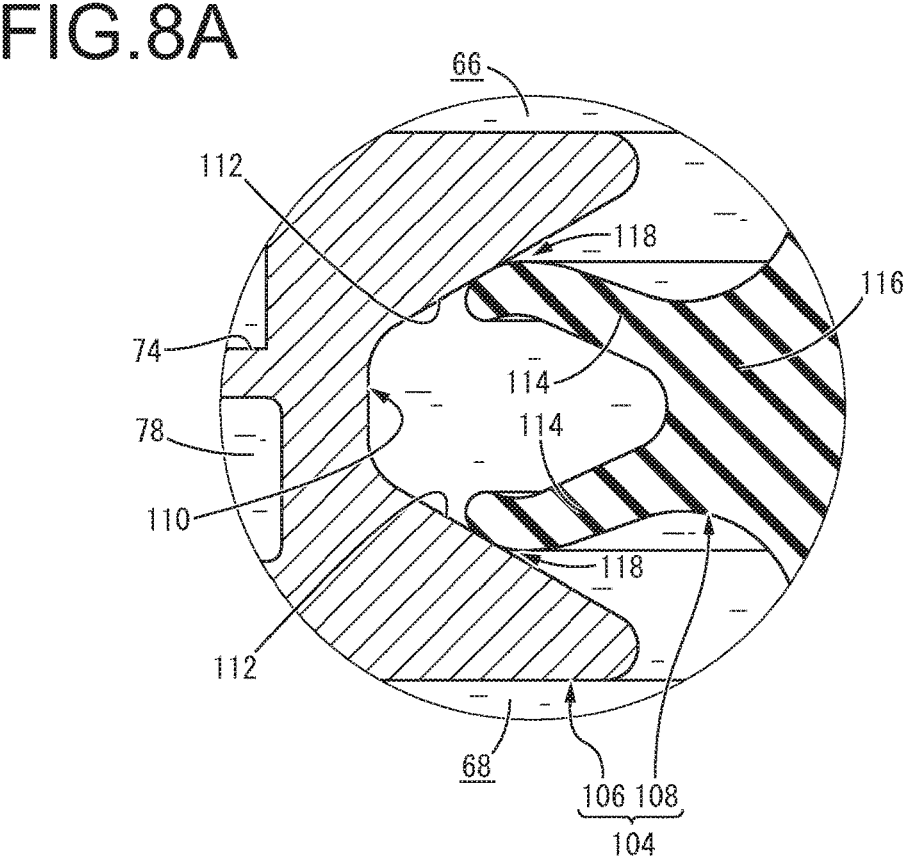

As FIGS. 6 and 8A show, the pair of branch parts 114, 114 of the partition wall rubber 108 are inserted in the concave groove 110 of the orifice member 106, and the protruding tip parts are pressed against the corresponding one of the upper and lower tapered faces 112, 112 of the concave groove 110. Consequently, in a stationary state in absence of vibration load input, sealers 118, 118 are constituted to fluid-tightly close the space between the orifice member 106 and the partition wall rubber 108 in the present embodiment. The pair of branch parts 114, 114 are pressed against the tapered faces 112, 112 of the orifice member 106 in the axial direction and elastically deformed. Meanwhile, in the radial directions, the branch parts 114, 114 are permitted to undergo sliding displacement and compression is avoided. Besides, in this embodiment, the pair of branch parts 114, 114 are pressed against the tapered faces 112, 112 in the axial direction, whereby they are elastically deformed such that the protruding tips are bent to the axial inside.

The lower mount 102 wherein the upper and lower fluid chambers 66, 68 are formed by being separated with the partition wall 104 of this structure is superposed and mounted to the lower face of the mount attachment section in the vehicle body 18, in the same way as the first embodiment.

In a mounted state to the vehicle, input of an axial vibration load displaces the inner shaft member 42 and the outer tube member 44 relative to each other in the axial direction, so that the upper and lower rubber elastic bodies 54, 56 and the partition wall rubber 108 undergo elastic deformation. For the partition wall rubber 108, the diametrical dimension of the part located further radially inside than the orifice member 106 is smaller than the diametrical free length for the upper and lower rubber elastic bodies 54, 56. Therefore, the difference in elastic deformation amount between the upper and lower rubber elastic bodies 54, 56 and the partition wall rubber 108 induces relative pressure fluctuation between the upper and lower fluid chambers 66, 68. Owing to this, the fluid flows through the orifice passage 78, and the vibration-damping effect based on the fluid flowing action is exerted.

Figure 8B:
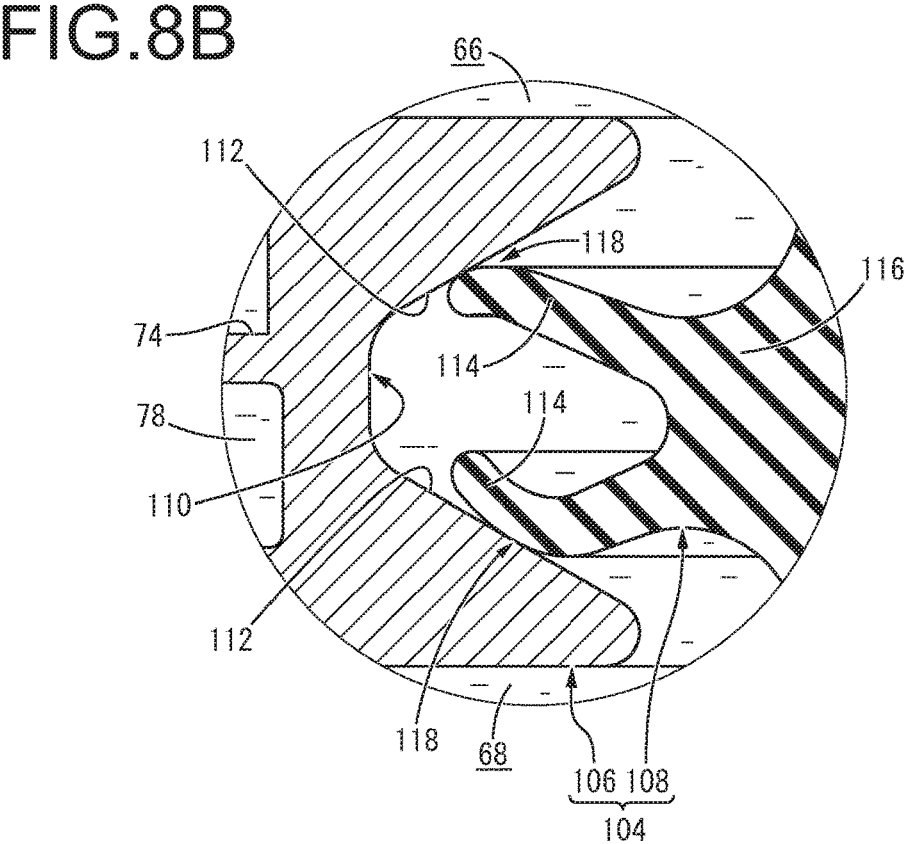

As FIG. 8B shows, also when an axial vibration is input, the partition wall rubber 108 is kept in such a state that the pair of branch parts 114, 114 are pressed against the tapered faces 112, 112 of the orifice member 106. Therefore, the relative pressure fluctuation of the upper and lower fluid chambers 66, 68 is efficiently induced, without short-circuit of the upper and lower fluid chambers 66, 68 through the gap between the orifice member 106 and the partition wall rubber 108.

Particularly in the present embodiment, also in absence of an axial vibration input, the pair of branch parts 114, 114 of the partition wall rubber 108 are axially pressed against the tapered faces 112, 112 of the orifice member 106. Consequently, from the initial period of the vibration input, short-circuit between the upper and lower fluid chambers 66, 68 is prevented, so that the relative pressure fluctuation of the upper and lower fluid chambers 66, 68 is induced more efficiently.

Where an axial vibration load is input, it is possible that one of the branch parts 114 is pressed against one of the tapered faces 112 more strongly, while the other of the branch parts 114 is apart from the other of the tapered faces 112. In other words, it is possible to use such an embodiment capable of providing sufficient seal performance by pressing one of the branch parts 114 against one of the tapered faces 112 more strongly, even if there is constituted only one sealer 118, either on the upper side or on the lower side.

The embodiments of the present invention have been described, but this invention is not limited by the specific description of the embodiments. For example, in the aforesaid embodiments, both the inner shaft member 42 and the outer tube member 44 have a cylindrical shape, but they may have a shape of a polygonal tube, an oval tube, an irregular tube, or the like. Additionally, the inner shaft member 42 is not necessarily limited to a tubular shape, and an item having a solid rod shape can be used.

The upper and lower rubber elastic bodies 54, 56 are not always limited to the rubber elastic bodies that are integrally formed, and they may be formed separately and each attached to the inner shaft member 42 and the outer tube member 44. Besides, the partition wall rubber 72 may be formed separately from either of the upper and lower rubber elastic bodies 54, 56 or both of them.

None of the upper and lower rubber elastic bodies 54, 56 and the partition wall rubber 72 need be bonded by vulcanization to the inner shaft member 42. For example, it is possible that a tubular metal fitting is fixed to the radially inner faces of the upper and lower rubber elastic bodies 54, 56 and the partition wall rubber 72, and the metal fitting is fitted and fixed externally to and about the inner shaft member 42, whereby the radially inner parts of the upper and lower rubber elastic bodies 54, 56 and the partition wall rubber 72 are attached to the inner shaft member 42 via the metal fitting.

In the above-referenced embodiments, there was described the structure wherein the partition wall rubber 72 protrudes to the outer periphery from the side of the inner shaft member 42, while the concave groove 76 opens to the radially inner face of the orifice member 70 provided on the side of the outer tube member 44. However, for example, it is also possible to employ a structure wherein the partition wall rubber 72 is provided on the side of the outer tube member 44, while the concave groove 76 is provided on the side of the inner shaft member 42. Specifically, for example, it is also possible that the orifice member and the partition wall rubber are disposed axially between the upper and lower rubber elastic bodies and the orifice member is fixed to the outer peripheral face of the inner shaft member, while the partition wall rubber is formed separately from the upper and lower rubber elastic bodies and fixed to the radially inner face of the outer tube member. In this case, for example as shown in U.S. Publication No. US 2017/284502, the upper rubber elastic body is formed separately from the lower rubber elastic body, while the upper rubber elastic body is not adhered to the inner shaft member and the outer tube member and can be attached thereto later. Before the upper rubber elastic body is attached to the inner shaft member and the outer tube member, the orifice member and the partition wall rubber are attached to the inner shaft member and the outer tube member and thus they can be disposed axially between the upper and lower rubber elastic bodies.

Moreover, the concave groove is not necessarily limited to an embodiment that is provided in the orifice member forming the orifice passage. For example, it is possible to form the concave groove directly in the outer tube member, or it is also possible to attach a member for formation of the concave groove other than the orifice member in relation to the outer tube member. As well, also in the case where the concave groove is provided on the side of the inner shaft member, it is possible to form the concave groove in the orifice member attached to the inner shaft member, or to form the concave groove directly in the inner shaft member, or to attach a member for formation of the concave groove other than the orifice member to the inner shaft member, or the like. According to these, it is also possible to form the concave groove on the side of the inner shaft member while providing the orifice member on the side of the outer tube member so as to get a long passage length for the orifice passage, for example.

In the first embodiment, the outer peripheral part 80 of the partition wall rubber 72 has a generally constant thickness dimension. However, for example, the thickness dimension of the outer peripheral part 80 may vary in the radial direction, by making both faces in the thickness direction tapered faces, or by forming convex and concave in the both faces in the thickness direction. Specifically, it is possible to use a partition wall rubber with a tapered cross sectional shape that is tapered off in the axial direction as it goes to the outer periphery, or the like. Moreover, the partition wall rubber 72 is not always limited to a shape expanding in the axis-perpendicular direction, i.e., the partition wall rubber 72 may expand inclining relative to the axis-perpendicular direction. Furthermore, in this case, the inclination angle may change in the radial direction gradually or in a stepwise manner.

In the second embodiment, as an example, there is shown the structure wherein the axially inner faces of the concave groove 110 of the orifice member 106 are tapered faces that are inclined to the axial outside as they go to the radial inside, while the pair of branch parts 114, 114 that are the outer peripheral part of the partition wall rubber 108 have a tapered shape that is inclined to the axial outside as they go to the outer periphery. However, the structure will do as long as the pair of branch parts and the axially inner faces of the concave groove are inclined relatively and abutted in the axial direction. Specifically, it is possible as well that the pair of branch parts have a tapered shape like the second embodiment, and the axially inner faces of the concave groove expand nearly in the axis-perpendicular direction, for example. Also, it is possible that the axially inner faces of the concave groove are tapered faces like the second embodiment, while the pair of branch parts extend roughly in the axis-perpendicular direction.

The specific shape of the concave groove is not limited to those shown in the aforesaid embodiments, either. The groove cross sectional shape of the concave groove can be changed as appropriate. Specifically, for example, it is possible to adopt a concave groove whose groove inner face is constituted by a curved face expanding continuously as having a substantially semi-circular cross section.

As long as the fluid chamber is provided on each axial side of the partition wall 64, the fluid chamber may be divided into a plurality in the circumferential direction, for example. In summary, in the present invention, the fluid chamber will do as long as it is provided on each axial side of the partition wall rubber. For example, it is also possible to improve the vibration-damping performance in relation to a vibration in the axis-perpendicular direction, by providing a further fluid chamber in the circumferential direction or in the axis-perpendicular direction.

In the aforementioned embodiments, there was shown an example wherein the present invention is applied to the lower mount of the cab mount. However, preferably, this invention is applicable as a general fluid-filled tubular vibration-damping device that receives an axial vibration input, e.g., as an engine mount, and the like.

What is claimed is:

1. A fluid-filled tubular vibration-damping device comprising:
    an inner shaft member;
    an outer tube member;
    a main rubber elastic body connecting the inner shaft member and the outer tube member;
    a filling region of a non-compressible fluid formed between the inner shaft member and the outer tube member;
    a partition wall rubber partitioning the filling region into two fluid chambers located at axially opposite sides of the partition wall rubber; and
    an orifice passage connecting the two fluid chambers, wherein
    the partition wall rubber protruding into the filling region is provided on one of a side of the inner shaft member and a side of the outer tube member, while a concave groove opening to the filling region and extending in a peripheral direction is provided on an other of the side of the inner shaft member and the side of the outer tube member,
    a tip part of the partition wall rubber is inserted in the concave groove without being compressed in an axis-perpendicular direction, while the tip part of the partition wall rubber inserted in the concave groove is configured to be pressed against an inner face of the concave groove in an axial direction so as to constitute a sealer obstructing a space between the partition wall rubber and the inner face of the concave groove in a fluid-tight manner,
    the concave groove has a constant groove cross sectional shape along an entire periphery of the concave groove, the entire periphery extending in the peripheral direction, and as seen in the groove cross sectional shape, a radial groove depth dimension of the concave groove is larger than an axial groove width dimension of the concave groove,
    upper and lower inside annular mating members extend outward from the inner shaft member, the upper inside annular mating member being separated from the lower inside annular mating member in the axial direction,
    the main rubber elastic body has upper and lower outer wall rubbers that constitute a wall of the filling region on each axial side, and the inner shaft member and the inside mating members are bonded to radially inner faces of the outer wall rubbers by vulcanization so that the inside mating members are embedded in the outer wall rubbers, while the outer tube member is bonded to outer peripheral faces of the outer wall rubbers by vulcanization, and
    the partition wall rubber is molded integrally with the outer wall rubber on each axial side.

2. The fluid-filled tubular vibration-damping device according to claim 1, wherein the partition wall rubber protrudes radially outward from the side of the inner shaft member, while the concave groove is provided on the side of the outer tube member to open radially inward.

3. The fluid-filled tubular vibration-damping device according to claim 2, wherein an orifice member forming the orifice passage is disposed in the outer tube member, while the concave groove is formed opening to a radially inner face of the orifice member.

4. The fluid-filled tubular vibration-damping device according to claim 1, wherein the tip part of the partition wall rubber inserted in the concave groove is separated in the axial direction from the inner face of the concave groove on each axial side so that the sealer is constituted by the tip part of the partition wall rubber being pressed against the inner face of the concave groove in the axial direction when the inner shaft member and the outer tube member are displaced relatively in the axial direction.

5. The fluid-filled tubular vibration-damping device according to claim 1, wherein a base part of the partition wall rubber is thicker in the axial direction than the tip part of the partition wall rubber inserted in the concave groove.

6. The fluid-filled tubular vibration-damping device according to claim 1, wherein the partition wall rubber is part of the main rubber elastic body.

7. The fluid-filled tubular vibration-damping device according to claim 1, wherein the axial groove width dimension of the concave groove is larger than an axial thickness dimension of the tip part of the partition wall rubber, and a gap is provided between the tip part of the partition wall rubber and a groove inner face of the concave groove, in the axial direction.

8. The fluid-filled tubular vibration-damping device according to claim 1, wherein a groove inner face of the concave groove includes two opposing faces, and in a state in which the inner shaft member and the outer tube member are displaced relative to each other in the axial direction, (i) a first portion of the tip part of the partition wall rubber contacts one of the two opposing faces and (ii) a second portion of the tip part of the partition wall rubber, positioned radially inward of the first portion, contacts the other of the two opposing faces.

9. A fluid-filled tubular vibration-damping device comprising:
an inner shaft member;
an outer tube member;
a main rubber elastic body connecting the inner shaft member and the outer tube member;
a filling region of a non-compressible fluid formed between the inner shaft member and the outer tube member;
a partition wall rubber partitioning the filling region into two fluid chambers located at axially opposite sides of the partition wall rubber; and
an orifice passage connecting the two fluid chambers, wherein
the partition wall rubber protruding into the filling region is provided on one of a side of the inner shaft member and a side of the outer tube member, while a concave groove opening to the filling region and extending in a peripheral direction is provided on an other of the side of the inner shaft member and the side of the outer tube member,
a tip part of the partition wall rubber is inserted in the concave groove without being compressed in an axis-perpendicular direction, while the tip part of the partition wall rubber inserted in the concave groove is configured to be pressed against an inner face of the concave groove in an axial direction so as to constitute a sealer obstructing a space between the partition wall rubber and the inner face of the concave groove in a fluid-tight manner,
the concave groove has a constant groove cross sectional shape along an entire periphery of the concave groove, the entire periphery extending in the peripheral direction, and as seen in the groove cross sectional shape, a radial groove depth dimension of the concave groove is larger than an axial groove width dimension of the concave groove,
upper and lower inside annular mating members extend outward from the inner shaft member, the upper inside annular mating member being separated from the lower inside annular mating member in the axial direction,
the main rubber elastic body has upper and lower outer wall rubbers that constitute a wall of the filling region on each axial side, and the inner shaft member and the inside mating members are bonded to radially inner faces of the outer wall rubbers by vulcanization so that the inside mating members are embedded in the outer wall rubbers, while the outer tube member is bonded to outer peripheral faces of the outer wall rubbers by vulcanization, and
an orifice member forming the orifice passage is provided inward on the side of the outer tube member, and a radially inner end of the orifice member is located radially inward of an outer peripheral end of the inside mating members so that the radially inner end of the orifice member is disposed axially between the inside mating members.

10. A fluid-filled tubular vibration-damping device comprising:
an inner shaft member;
an outer tube member;
a main rubber elastic body connecting the inner shaft member and the outer tube member;
a filling region of a non-compressible fluid formed between the inner shaft member and the outer tube member;
a partition wall rubber partitioning the filling region into two fluid chambers located at axially opposite sides of the partition wall rubber; and
an orifice passage connecting the two fluid chambers, wherein
the partition wall rubber protruding into the filling region is provided on one of a side of the inner shaft member and a side of the outer tube member, while a concave groove opening to the filling region and extending in a peripheral direction is provided on an other of the side of the inner shaft member and the side of the outer tube member,
a tip part of the partition wall rubber is inserted in the concave groove without being compressed in an axis-perpendicular direction, while the tip part of the partition wall rubber inserted in the concave groove is configured to be pressed against an inner face of the concave groove in an axial direction so as to constitute a sealer obstructing a space between the partition wall rubber and the inner face of the concave groove in a fluid-tight manner,
an axial groove width dimension of the concave groove is larger than an axial thickness dimension of the tip part of the partition wall rubber, and a gap is provided between the tip part of the partition wall rubber and a groove inner face of the concave groove, in the axial direction, and the groove inner face of the concave groove includes two opposing faces, and in a state in which the inner shaft member and the outer tube member are displaced relative to each other in the axial direction, (i) a first portion of the tip part of the partition wall rubber contacts one of the two opposing faces and (ii) a second portion of the tip part of the partition wall rubber, positioned radially inward of the first portion, contacts the other of the two opposing faces.

* * * * *